(12) United States Patent
Blakely (10) Patent No.: US 11,606,194 B2
(45) Date of Patent: Mar. 14, 2023

(54) SECURE CRYPTOGRAPHIC SYSTEM FOR DATALINKS

(71) Applicant: The United State of America as represented by the Secretary of the Army, Washington, DC (US)

(72) Inventor: Jonathan N Blakely, Madison, AL (US)

(73) Assignee: United States Government as represented by the Secretary of the Army, Washington, DC (US)

( * ) Notice: Subject to any disclaimer, the term of this patent is extended or adjusted under 35 U.S.C. 154(b) by 155 days.

(21) Appl. No.: 16/945,168

(22) Filed: Jul. 31, 2020

(65) Prior Publication Data
US 2022/0038262 A1 Feb. 3, 2022

(51) Int. Cl.
*H04L 9/06* (2006.01)
*H04L 9/08* (2006.01)
*F42B 30/00* (2006.01)

(52) U.S. Cl.
CPC .......... *H04L 9/0656* (2013.01); *F42B 30/006* (2013.01); *H04L 9/0869* (2013.01)

(58) Field of Classification Search
CPC ............................. H04L 9/0656; H04L 9/0869
See application file for complete search history.

(56) References Cited

U.S. PATENT DOCUMENTS

| | | | |
|---|---|---|---|
| 6,868,495 B1 | 3/2005 | Glover | |
| 8,843,303 B1 * | 9/2014 | Young | G08G 5/006 701/122 |
| 9,450,749 B2 | 9/2016 | Hammersmith | |
| 9,515,823 B2 | 12/2016 | Winslow et al. | |
| 9,871,772 B1 | 1/2018 | Weinstein et al. | |
| 2003/0016821 A1 | 1/2003 | Hammersmith | |
| 2010/0020975 A1 * | 1/2010 | Bissett | H04W 12/50 380/283 |
| 2016/0209290 A1 * | 7/2016 | Shue | B64C 29/0033 |
| 2017/0343326 A1 * | 11/2017 | Weiland | F41J 5/056 |
| 2018/0063096 A1 | 3/2018 | Rogson | |

(Continued)

FOREIGN PATENT DOCUMENTS

EP 1 470 660 B1 10/2004

OTHER PUBLICATIONS

"The Future of Cybersecurity is a the Quantum Random Number Generator", Abelian and Pruneri, IEEE Spectrum (Jun. 28, 2018).

*Primary Examiner* — Phy Anh T Vu
(74) *Attorney, Agent, or Firm* — Jeremy D. Tillmnan (57) ABSTRACT

The present disclosure provides a system for securing wireless data communication. The system includes a launcher and a projectile. The launcher has a random number generator, a launcher memory, a launcher encryption/decryption module, and a launcher transceiver. The projectile has a projectile memory, a projectile encryption/decryption module, and a projectile transceiver. Both the launcher encryption/decryption module and the projectile encryption/decryption module are configured to use the one-time pad to encrypt and to decrypt data. The system is configured to establish a temporary datalink at a point in time in which the projectile and the launcher are substantially collocated so that the one-time pad can be transmitted from random number generator located in the launcher to the projectile memory using the temporary datalink.

17 Claims, 9 Drawing Sheets

(56) References Cited

U.S. PATENT DOCUMENTS

| | | | |
|---|---|---|---|
| 2019/0027047 A1* | 1/2019 | Kim | G09B 9/003 |
| 2019/0137219 A1* | 5/2019 | Bockmon | F41G 5/16 |
| 2019/0195601 A1* | 6/2019 | Finkenberg | F41H 13/0093 |
| 2019/0277603 A1* | 9/2019 | Livingstone | F41G 9/02 |
| 2019/0310046 A1* | 10/2019 | Corona | F41H 7/044 |
| 2019/0367169 A1* | 12/2019 | O'Leary | F41G 7/226 |
| 2020/0158471 A1* | 5/2020 | Armstrong | F41G 3/265 |
| 2020/0386515 A1* | 12/2020 | Cantine | F41G 7/007 |
| 2022/0189313 A1* | 6/2022 | Allen | G08G 5/0091 |

* cited by examiner

SECURE CRYPTOGRAPHIC SYSTEM FOR DATALINKS

DEDICATORY CLAUSE

The subject matter of the present application described herein may be manufactured, used and licensed by or for the United States Government for governmental purposes without the payment of any royalties.

FIELD

The present disclosure generally relates to a secure cryptographic system, and more specifically, to a secure cryptographic system for securing wireless data communication between two or more objects.

BACKGROUND

Contemporary military systems are equipped with communication datalinks for wirelessly conveying data to and from a launcher and a corresponding projectile (e.g., missile). The communication datalinks are encrypted to prevent an adversary from eavesdropping on the communication and subsequently exploiting any obtained information. Many different encryption algorithms and/or techniques have been developed as the practice and study of secure communications. For example, one technique is the conventional public-key encryption that relies on the presumed difficulty in calculating certain mathematical problems to underwrite the security of a transmitted signal. The conventional public-key encryption utilizes a costly certification process to build sufficient trust in the encryption strength because security is not provable.

One issue with known encryption algorithms and/or techniques, such as the conventional public-key encryption, is that they are vulnerable to advances in mathematics and increases in the power of computing technology. It is widely believed that the continued development of the quantum computing field may result in a quantum computer that could threaten the security of currently-known encryption algorithms and/or techniques.

An additional issue with contemporary military systems is that it is often desirable to keep the cryptographic implementation details secret or hidden. Knowledge of the cryptographic implementation details may enable an adversary to develop new attacks on the communication datalinks. Accordingly, the system must further include anti-tamper hardware, thus increasing the system's cost and complexity.

Therefore, a new cryptographic system is needed to maintain a secure communication datalink between two or more objects (e.g., a launcher and a corresponding projectile).

BRIEF SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

In one embodiment, the present disclosure provides a system for securing wireless data communication. The system includes a launcher and a projectile. The launcher has a random number generator, a launcher memory, a launcher encryption/decryption module, and a launcher transceiver. The random number generator is configured to generate a one-time pad. The launcher memory is configured to store the one-time pad generated by the random number generator. The launcher encryption/decryption module is configured to use the one-time pad stored in the launcher memory to encrypt data before said data is transmitted by the launcher transceiver. The launcher encryption/decryption module is configured to use the one-time pad stored in the launch memory to decrypt data received by the launcher transceiver. The projectile has a projectile memory, a projectile encryption/decryption module, and a projectile transceiver. The projectile memory is configured to store the one-time pad generated by the random number generator. The projectile encryption/decryption module is configured to use the one-time pad stored in the projectile memory to encrypt data before said data is transmitted by the projectile transceiver. The projectile encryption/decryption module is configured to use the one-time pad stored in the projectile memory to decrypt data received by the projectile transceiver. The system is configured to establish a temporary datalink at a point in time in which the projectile and the launcher are substantially collocated. The system is configured to transmit the one-time pad from the random number generator to the projectile memory using the temporary datalink. In another embodiment, described is a method that comprises receiving a fire command from a launcher; generating a one-time pad from a random number generator; establishing a temporary datalink at a point in time in which the launcher and a projectile are substantially collocated and the one-time pad is stored in both a projectile memory of the projectile and a launcher memory of the launcher, encrypting data using the one-time pad and a launcher encryption/decryption module; transmitting the encrypted data via a communication datalink; and decrypting the encrypted data using the one-time pad and the projectile encryption/decryption module.

BRIEF DESCRIPTION OF THE DRAWINGS

For a better understanding of the nature and objects of the disclosure, reference should be made to the following detailed description taken in conjunction with the accompanying drawings, in which.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible. At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The present disclosure provides a system 10 for securing wireless data communication between two or more objects. The system 10 relies upon a one-time pad encryption scheme to encrypt a message. For purposes of this disclosure, the message to be encrypted will be referred to as the "plaintext," and the encrypted message will be referred to as the "cyphertext."

Figure 1:
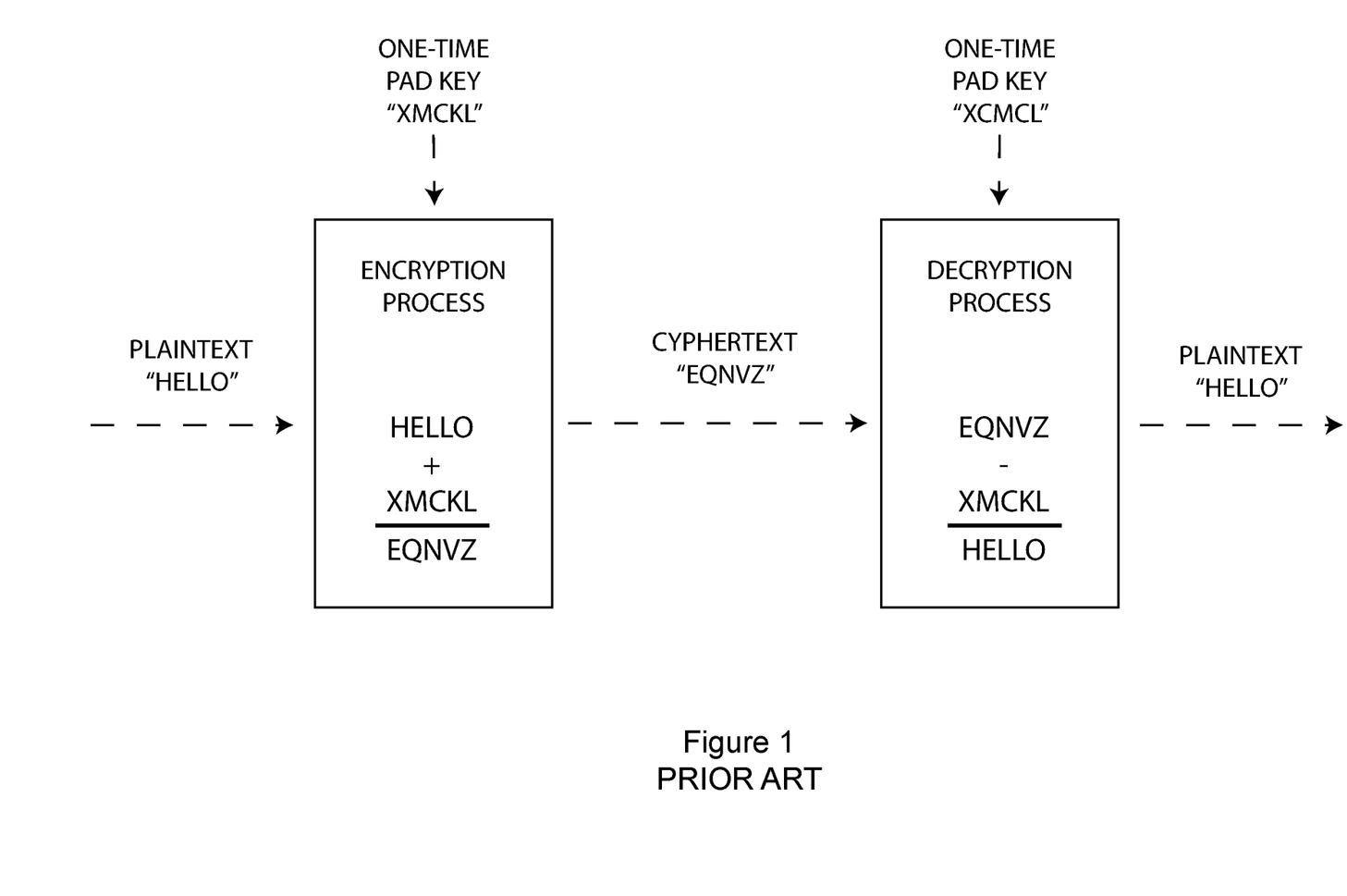
FIG. 1 is an illustration generally showing an operation of a one-time pad encryption scheme.

FIG. 1 generally illustrates how a one-time pad encryption scheme works, in which a one-time pad is used as a key to encrypt (and subsequently, decrypt) plaintext into cyphertext. The one-time pad is a list of truly random characters in which there is no pattern that can be used to determine one character given any other characters within the pad. Depending on the situation, the characters in the one-time pad can be drawn from any desired alphabet. For example, the characters in the one one-time pad may use Arabic numbers and Roman letters, whereas another one-time pad might use bits (commonly represented as 0s and 1s). Each character in the one-time pad can be used to encrypt a character in the plaintext using an encryption process, for example, modulo arithmetic, provided that the encryption process can be subsequently reversed for decryption of the cyphertext into the plaintext.

Using a one-time pad encryption scheme like that shown in FIG. 1, there is no relationship between how one character is encrypted and how another character is encrypted. Accordingly, when a one-time pad encryption scheme is used, there is no way to determine the one-time pad or how the encryption was performed. For example, a plaintext of "HELLO" could be encrypted using a particular one-time pad to produce a cyphertext of "EQNVZ". Using a different one-time pad, a plaintext of "TABLE" could also result in the same cyphertext of "EQNVZ." The cyphertext of "EQNVS" is then decrypted "HELLO" using the corresponding one-time pad. Since there is no way to know which one-time pad was used for the encryption, it is impossible to recover a plaintext without knowing the exact one-time pad used to encrypt the cyphertext. Thus, it is generally accepted that use of a one-time pad is the only theoretically secure way to provably protect data.

To ensure a one-time pad remains secure, the pad must be (1) truly random, (2) used only once, (3) delivered in a manner that prevents interception, and (4) be of the same length or longer than the plaintext to be encrypted. These restrictions typically render the use of a one-time pad encryption scheme impractical. However, the system 10 of the present disclosure provides a manner in which, despite these restrictions, a one-time pad can be used to secure wireless data communication between two or more objects.

The system 10 can be used in a number of different settings in which one object functions as a "base station" and another object functions as a "mobile station." The base station and the mobile station are at one point in time substantially collocated with each other, thereby enabling a temporary datalink that can be used to securely distribute the one-time pad amongst both the base station and the mobile station. As used in the context of this disclosure, the term "substantially collocated" means the objects are located in a close geographical proximity such that either a wired connection or a short-range wireless connection (e.g., infrared) can be established. The one-time pad can be generated, for example, by a hardware true random number generator. The hardware true random number generator may be housed in the base station, the mobile station, or some other controlled environment that is substantially collocated with both the base station and the mobile station at one point in time. After secure distribution of the one-time pad, the mobile station is launched from the base station such that the mobile station is no longer substantially collocated with the base station. The system 10 enables secure communication between the mobile station and the base station using a one-time pad. The mobile station can then perform a mission of a known duration before either returning to the base station or being destroyed.

Figure 2:
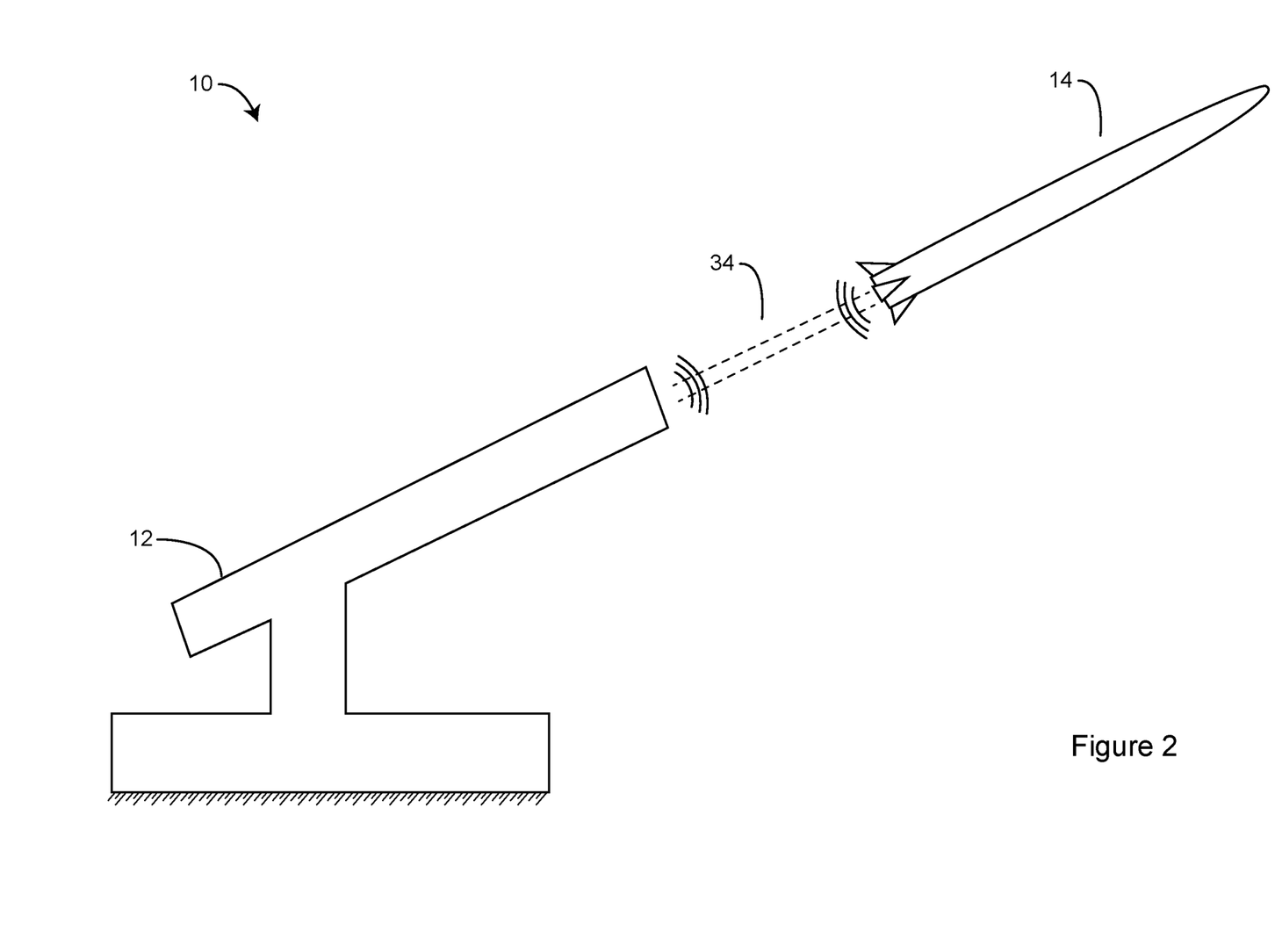
FIG. 2 is an illustration showing a system for securing wireless data communication between a projectile and a launcher in accordance with the present disclosure.

One particular military setting in which the system 10 could be used to secure wireless data communication between two or more objects, illustrated in FIG. 2, is a launcher 12 and a projectile 14 (e.g., missile or warhead). In this setting, the launcher 12 functions as the base station and the projectile 14 functions as the mobile station. FIG. 2 shows a schematic of the system 10 in which the launcher 12 and the projectile 14 are able to securely communicate via a communication datalink 34. This particular military setting is discussed throughout the remainder of this disclosure; however, a person of ordinary skill in the art will understand that the system 10 could be used in other settings. As a non-limiting example, the base station could be a drone base and the mobile station could be a drone that flies a mission of a limited duration before returning to the drone base.

Figure 3:
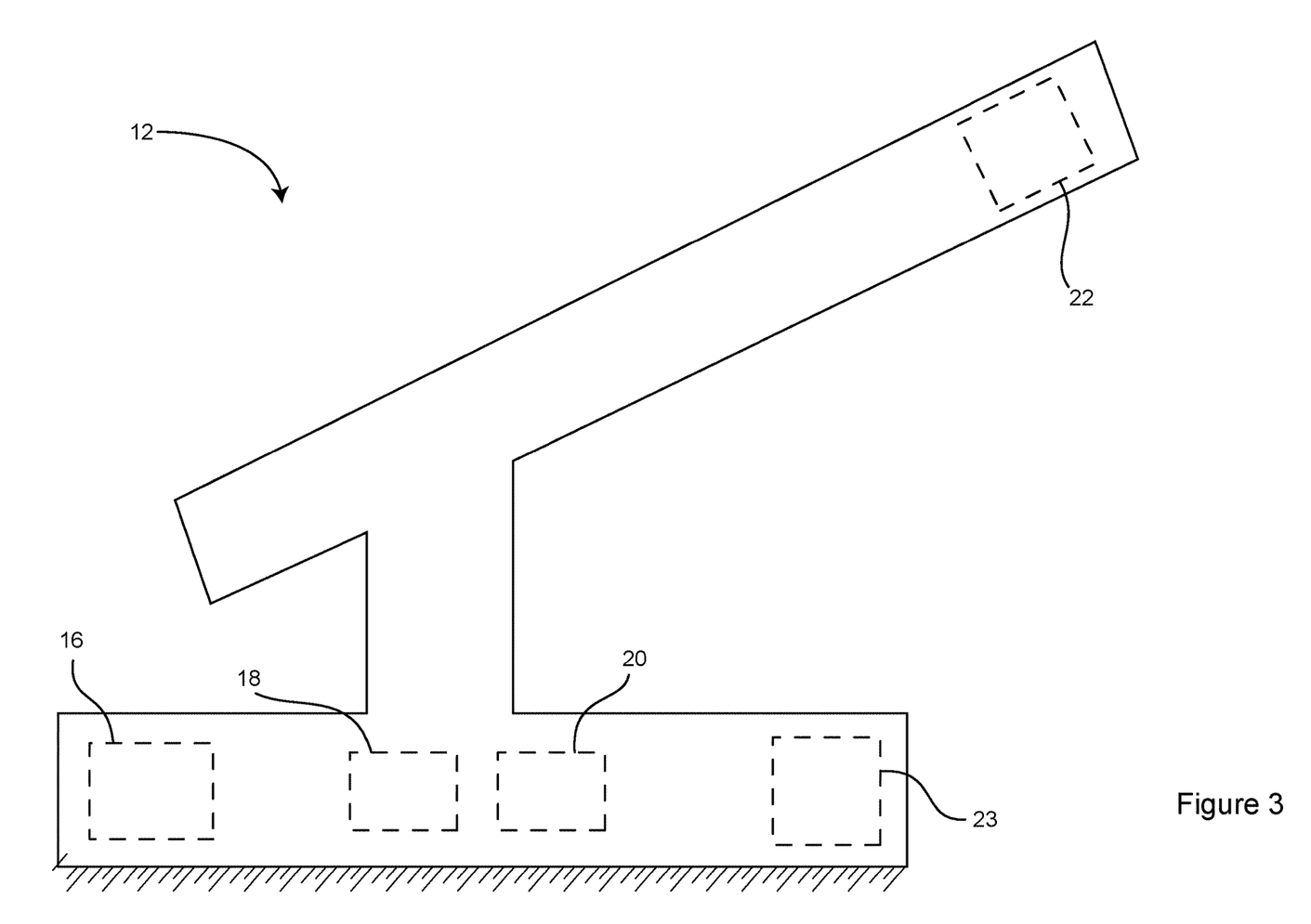
FIG. 3 is an illustration of the launcher shown in FIG. 2.
Figure 3A:
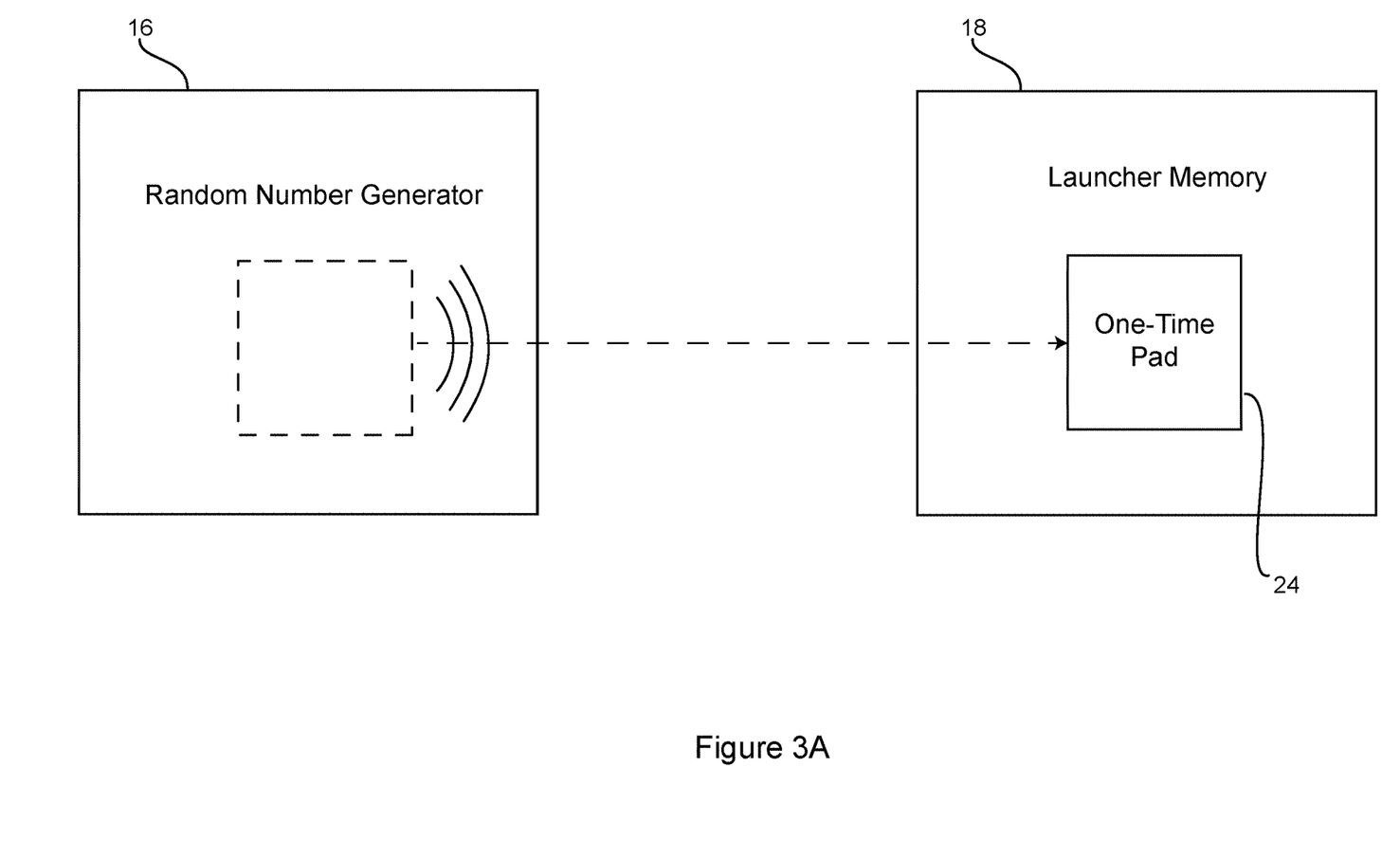
FIG. 3A is a schematic diagram of the launcher generally showing the function of a random number generator transmitting a copy of a one-time pad to a launcher memory.

As seen in FIG. 3, the launcher 12 includes a random number generator 16, a launcher memory 18, a launcher encryption/decryption module 20, a launcher transceiver 22, and at least one launcher sensor 23. The random number generator 16 generates a one-time pad 24 that is stored in the launcher memory 18, shown schematically in FIG. 3A. A person of ordinary skill in the art will understand that the random number generator 16 must generate a truly random number to be used as the one-time pad 24. One example of the random number generator 16 may be a hardware true random number generator (sometimes referred to as a TRNG). Alternatively, the random number generator 16 could be a microprocessor connected to a random number server that provides random numbers generated from a truly random source.

In the embodiment of the system 10 shown in FIGS. 2-6, the random number generator 16 is located within the launcher 12. Locating the random number generator 16 within the launcher 12 rather than the projectile 14 has several benefits for the projectile-launcher military setting. One benefit is that the launcher 12 has a less extreme, more controllable environment as compared to the environment of the projectile 14. This is especially critical if the random number generator 16 is a TRNG. A TRNG employs positive entropy physical effects to perform its function of randomly generating numbers. Such positive entropy physical effects are typically sensitive to extremes of temperature, supply voltage fluctuations, or rapid accelerations. Accordingly, locating the TRNG within the more controllable environment of the launcher 12 may help ensure proper performance of the TRNG. Another benefit of locating the random number generator 16 inside the launcher 12 rather than the projectile 14 is that it enables the random number generator to be used more than once, thus reducing the overall costs associated with the system 10. In the launcher-projectile military setting, locating the random number generator 16 within the projectile 14 instead of the launcher 12 would result in the destruction of a random number generator for each projectile that is launched and subsequently exploded. A person of ordinary skill in the art will recognize, however, that in a different setting, the random number generator could be located within the mobile station rather than the base station.

Figure 3B:
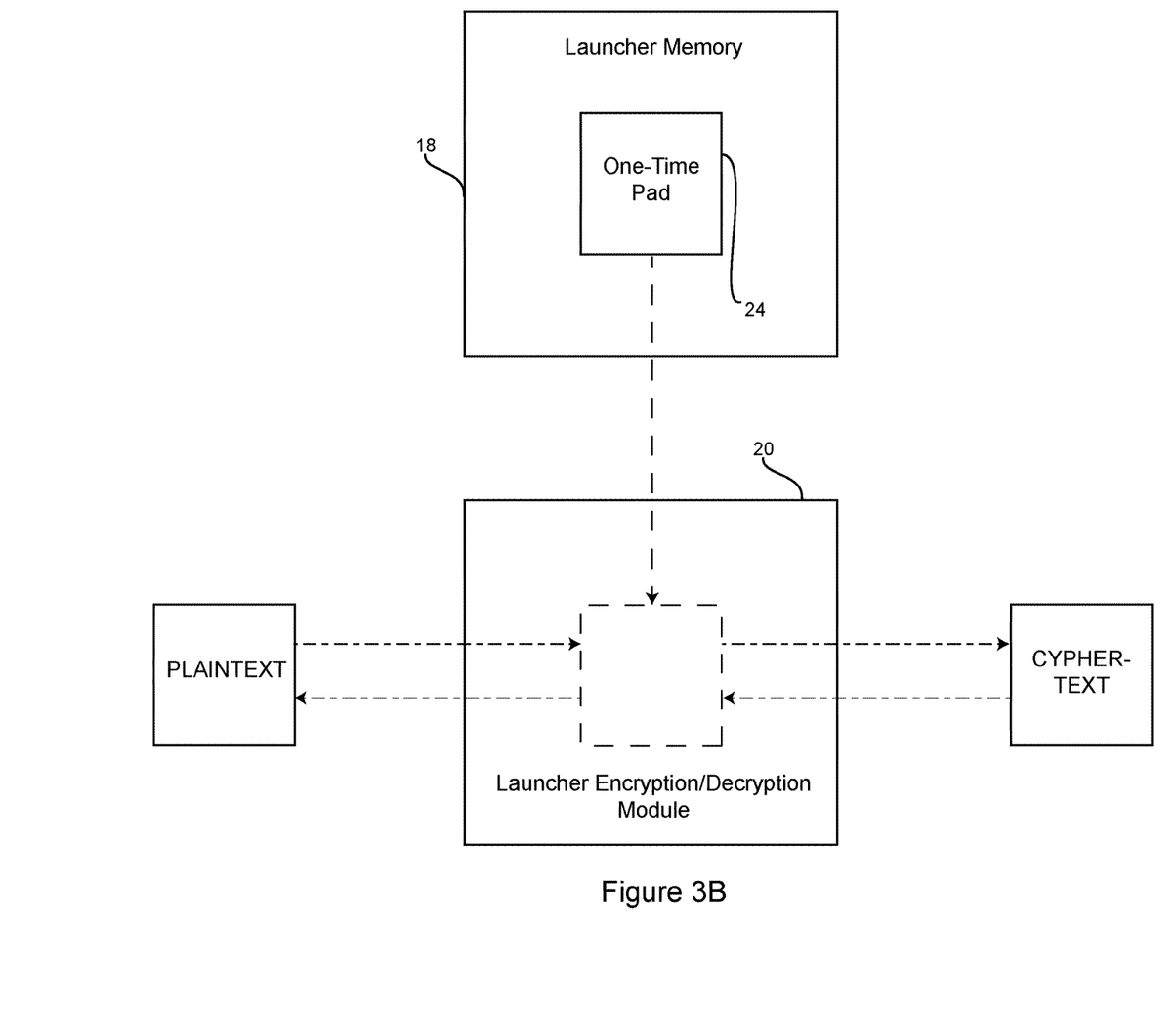
FIG. 3B is a schematic diagram of the launcher generally showing the functioning of a launcher encryption/decryption module using a copy of the one-time pad stored in the launcher memory.

As illustrated in FIG. 3B, the launcher encryption/decryption module 20 uses the one-time pad 24 as a key to perform an encryption function and/or a decryption function. When performing the encryption function, the launcher encryption/decryption module 20 uses the one-time pad 24 to encrypt plaintext into cyphertext before transmitting the cyphertext via the launcher transceiver 22. By way of example, the plaintext may be environmental information detected by the launcher sensor(s) 23 or information relevant to the desired path of the missile, the nature of the target or additional information such as a "mission abort" command. When performing the decryption function, the launcher encryption/decryption module 20 uses the one-time pad 24 to decrypt cyphertext received by the launcher transceiver 22 from, for example, the projectile 14 into plaintext. Accordingly, the launcher 12 can transmit cyphertext to, and receive cyphertext from, the projectile 14 using the one-time pad 24 stored in the launcher memory 18.

Figure 4:
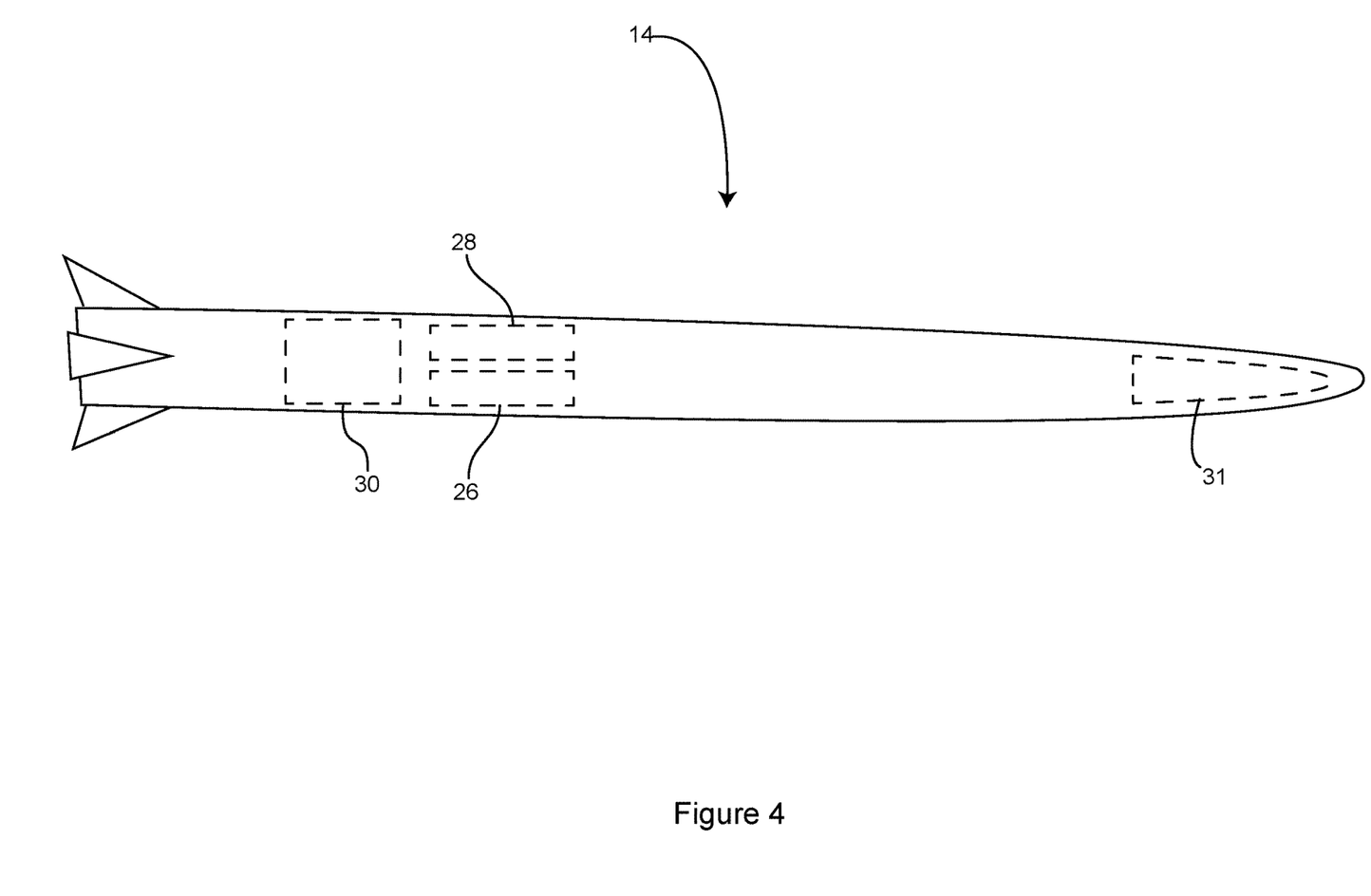
FIG. 4 is an illustration of the projectile shown in FIG. 2.
Figure 4A:
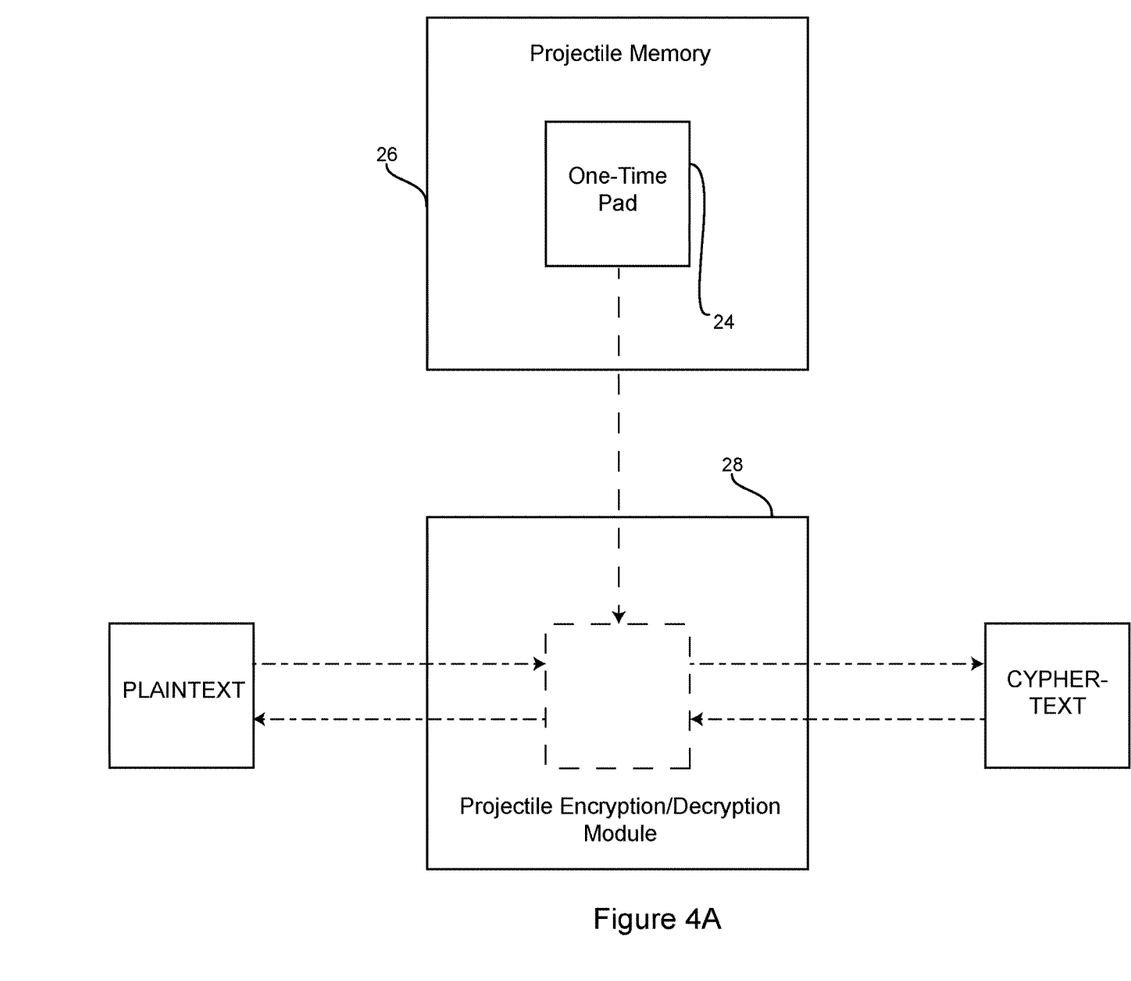
FIG. 4A is a schematic diagram of the projectile generally showing the functioning of a projectile encryption/decryption module using a copy of the one-time pad stored in a projectile memory.

As seen in FIG. 4, the projectile 14 includes a projectile memory 26, a projectile encryption/decryption module 28, a projectile transceiver 30, and at least one projectile sensor 31. The projectile memory 26 is configured to store the one-time pad 24. As discussed in greater detail below, the one-time pad 24 is transmitted from the launcher 12 to the projectile memory 26 via a temporary datalink. The projectile encryption/decryption module 28 uses the one-time pad 24 as a key to perform an encryption function and/or a decryption function, as illustrated in FIG. 4A. When performing the encryption function, the projectile encryption/decryption module 28 uses the one-time pad 24 to encrypt plaintext into cyphertext before transmitting the cyphertext via the projectile transceiver 30. By way of example, the plaintext may be environmental information detected by the projectile sensor(s) 23. When performing the decryption function, the projectile encryption/decryption module 28 uses the one-time pad 24 to decrypt cyphertext received by the projectile transceiver 30 from, for example, the launcher 12 into plaintext. Accordingly, the projectile 14 can transmit cyphertext to, and receive cyphertext from, the projectile 14 using the one-time pad 24 stored in the projectile memory 26.

Figure 5:
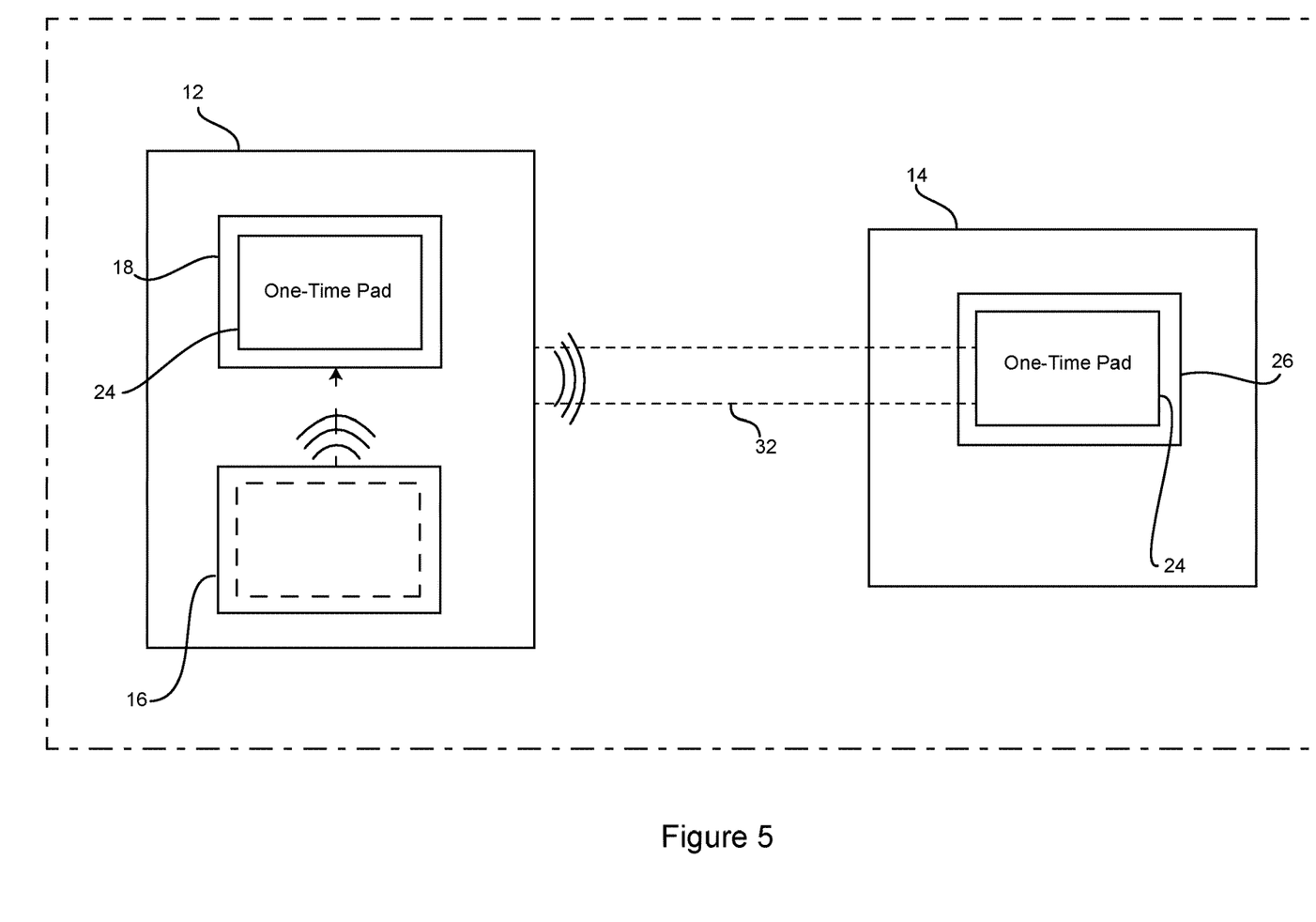
FIG. 5 is a schematic diagram showing a temporary datalink between the projectile and the launcher for transmitting a copy of the one-time pad to the projectile memory.

The one-time pad 24 is transmitted from the launcher 12 to the projectile memory 26 via a temporary datalink 32. As illustrated in FIG. 5, the temporary datalink 32 is established when the launcher 12 and the projectile 14 are substantially collocated (represented by the dash-dot-dash box in FIG. 5). More specifically, the temporary datalink 32 between the launcher 12 and the projectile 14 is established at some point after the projectile 14 is loaded into the launcher and but before launch. One having ordinary skill in the art would understand that collocation is inherent in the nature of a missile launch system. Furthermore, the pad may be generated quickly and not until the fire command is received such that the pad does not reside in memory any longer than absolutely necessary. The temporary datalink 32 between the projectile 14 and the launcher 12 enables the one-time pad 24 to be received and stored in the projectile memory 26.

A person of ordinary skill in the art will understand that there are a number of ways of establishing the temporary datalink 32. For example, the temporary datalink 32 could be established using electromagnetic radiation (e.g., radio waves or IR). Alternatively, the temporary datalink 32 could be established using physical contact points (e.g., electrical contacts or wired connection) between the launcher 12 and the projectile 14. A person of ordinary skill in the art will further understand that the temporary datalink 32 may be established between the projectile memory 26 and one of the launcher memory 18, the random number generator 16, or some other internal component (not shown) of the launcher 12 for transmitting the one-time pad 24 to the projectile memory 26.

After the one-time pad is stored in the projectile memory 26, the temporary datalink 32 is terminated. Thus, the datalink 32 is considered temporary and is created (i) when the launcher 12 and projectile 14 are substantially collocated and (ii) for only a brief period of time (e.g., less than about 1 minute, such as, for example, less than about 45 seconds, less than about 30 seconds, less than about 15 seconds, less than about 10 seconds and less than about 5 seconds). The limited nature of the temporary datalink 32 ensures that the one-time pad 24 is delivered to the projectile 14 in a manner that substantially prevents interception by an adversary.

Figure 6:
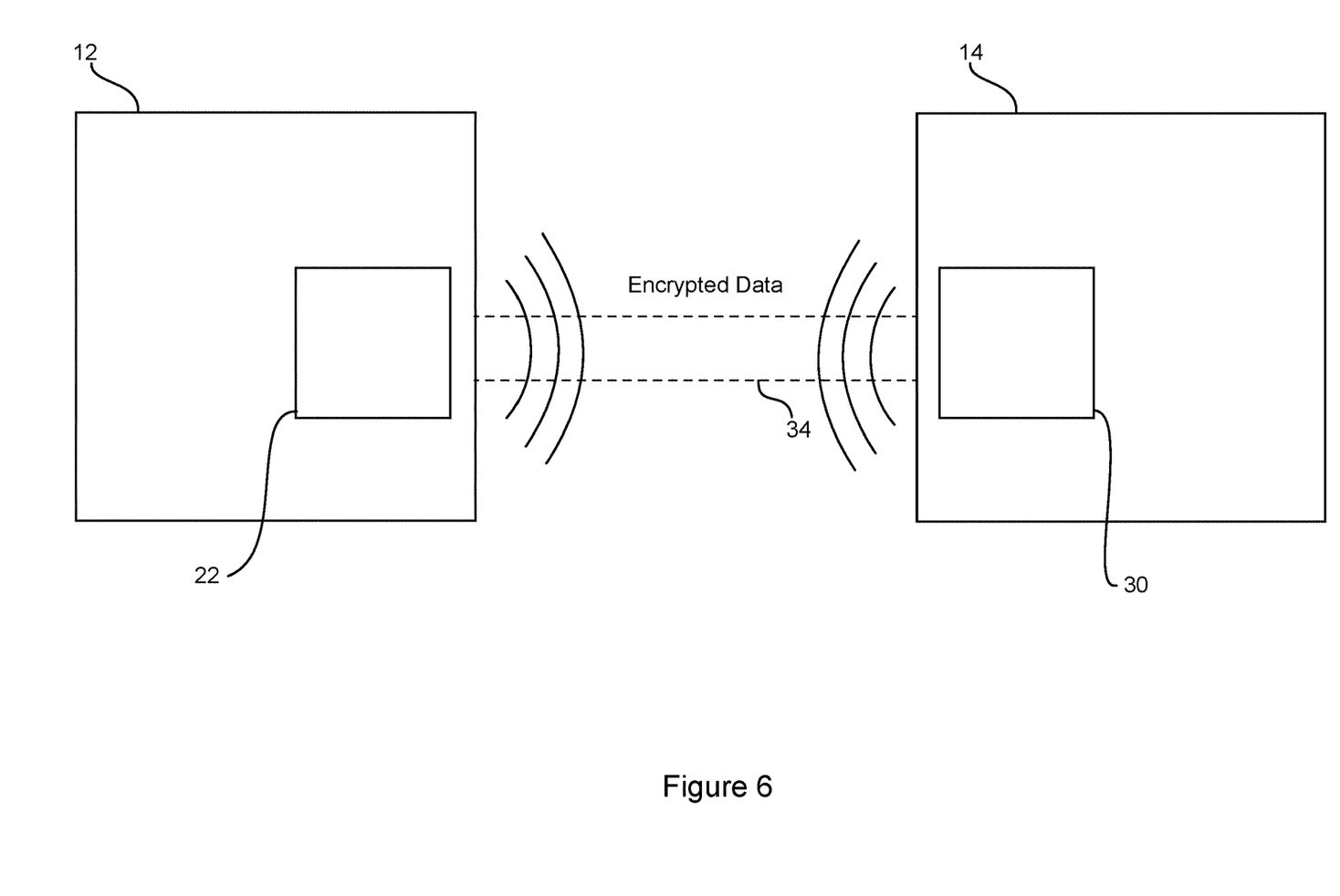
FIG. 6 is a schematic diagram showing a communication datalink between a projectile transceiver and a launcher transceiver.

A secure communication datalink 34 can be maintained between the projectile 14 and the launcher 12 after launching the projectile, as illustrated in FIG. 2 and more specifically in FIG. 6. Cyphertext encrypted by the one-time pad 24 can freely flow between the launcher transceiver 22 and the projectile transceiver 30 without concern of interception by an adversary. Even if an adversary intercepts cyphertext flowing between the launcher transceiver 22 and the projectile transceiver 30, the adversary will be unable to decrypt the cyphertext and obtain any useful information without knowledge of the one-time pad 24. As illustrated in FIG. 5, only two copies of the one-time pad 24 will exist in system 10: a copy stored on the launcher memory 18 and a copy stored on the projectile memory 26. In some situations, it may be desirable for a third copy of the one-time pad 24 may be stored on a memory of the random number generator 16. In such a case, a person of ordinary skill in the art will understand the importance of verifying that the random number generator 16 is properly safeguarded (e.g., communicated via a wired link that is not physically connected to a large network) to ensure that it only transmits the one-time pad 24 to the launcher memory 18 and/or the projectile memory 26 to ensure that the one-time pad is not transmitted in an undesirable manner to another object or entity (e.g., an adversary).

As previously discussed, the one-time pad 24 must be of sufficient length to ensure that all plaintext needing to be transmitted between the launcher 12 and the projectile 14 throughout the mission life of the projectile 14 can be encrypted into cyphertext. In the launcher-projectile setting, the mission life of the projectile 14 is of a known duration because the projectile will either successfully engage a target or exhaust the fuel supply. To calculate the length of the one-time pad 24, the following equation (hereinafter, Equation 1) can be used:

$$N=T_{fl}(r_p+r_l),$$

where N is the maximum possible number of bits that the launcher 12 and/or the projectile 14 may need for encryption/decryption of plaintext/cyphertext during a projectile's life time; $T_{fl}$ is the maximum flight time for the projectile allowed by the fuel supply; $r_p$ is the maximum data rate for communication from the projectile to the launcher; and $r_l$ is the maximum data rate for communication from the launcher to the projectile. As used in the context of this disclosure, the term "data rate" means the number of bits per unit time at which an object can communicate. The maximum data rate for communication is limited by the bandwidth and the noise floor of the communication datalink 34.

Equation 1 therefore provides the necessary length for the one-time pad 24 can be calculated.

After a user issues a fire command for launching the projectile 14 from the launcher 12, an amount of time $T_C$ will elapse before the projectile is launched. The one-time pad 24 must be generated by the random number generator 16 and stored in both the launcher memory 18 and the projectile memory 26 before the projectile 14 is launched. Accordingly, the one-time pad 24 must be generated by the random number generator 16 and stored in the launcher memory 18 and the projectile memory 26 at a rate faster than $N/T_C$, where N is calculated using Equation 1. This will enable the projectile 14 and the launcher 12 to securely communicate via the communication datalink 34 after the projectile is launched.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Further, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. A system for securing wireless data communication, the system comprising:
   a launcher having a random number generator, a launcher memory, a launcher encryption/decryption module, and a launcher transceiver, the random number generator being configured to generate a one-time pad in response to a fire command, the launcher memory being configured to store the one-time pad generated by the random number generator,
   a projectile having a projectile memory, a projectile encryption/decryption module, and a projectile transceiver, the projectile memory being configured to store the one-time pad generated by the random number generator,
   wherein the system is configured to establish a temporary datalink at a point in time in which the projectile and the launcher are substantially collocated, the system being configured to transmit the one-time pad from the random number generator to the projectile memory using the temporary datalink,
   wherein the one-time pad is of a sufficient length to ensure a plaintext transmitted from the launcher and the projectile is encrypted into cyphertext, and wherein the length of the one-time pad is calculated using the following equation:

$$N=T_{fl}(r_p+r_l),$$

where N is a maximum possible number of bits that the launcher or the projectile needs for encryption/decryption of plaintext/cyphertext during the projectile's life time; $T_{fl}$ is a maximum flight time for the projectile allowed by a fuel supply; $r_p$ is a maximum data rate for communication from the projectile to the launcher; and $r_l$ is the maximum data rate for communication from the launcher to the projectile.

2. The system of claim 1, wherein the system is further configured to have a communication datalink between the launcher transceiver and the projectile transceiver after the projectile is launched by the launcher.

3. The system of claim 2, wherein data being transmitted over the communication datalink is encrypted using the one-time pad.

4. The system of claim 1, wherein the launcher further has at least one launcher sensor, the at least one launcher sensor being configured to detect environmental information.

5. The system of claim 1, wherein the projectile further has at least one projectile sensor, the at least one projectile sensor being configured to detect environmental information.

6. The system of claim 1, wherein the launcher encryption/decryption module is configured to use the one-time pad stored in the launcher memory to encrypt data before the data is transmitted by the launcher transceiver.

7. The system of claim 1, wherein at least two copies of the one-time pad are present in the system.

8. The system of claim 7, wherein one copy of the at least two copies of the one-time pad is present in the launcher memory.

9. The system of claim 7, wherein one copy of the at least two copies of the one-time pad is present in the projectile memory.

10. The system of claim 7, wherein a third copy of the one-time pad is present in the random number generator.

11. The system of claim 1, wherein the one-time pad is generated by the random number generator and stored in the launcher memory and the projectile memory at a rate faster than $N/T_c$, where Tc is the amount of time elapsed before the projectile is launched.

12. A method comprising:
   generating a one-time pad from a random number generator in response to a fire command;
   establishing a temporary datalink at a point in time in which the launcher and a projectile are substantially collocated and the one-time pad is stored in both a projectile memory of the projectile and a launcher memory of the launcher,
   encrypting data using the one-time pad and a launcher encryption/decryption module;
   transmitting the encrypted data via a communication datalink; and
   decrypting the encrypted data using the one-time pad and the projectile encryption/decryption module,
   wherein the one-time pad is of a sufficient length to ensure a plaintext transmitted from the launcher and the projectile is encrypted into cyphertext, and
   wherein the length of the one-time pad is calculated using the following equation:

$$N=T_{fl}(r_p+r_l),$$

where N is a maximum possible number of bits that the launcher or the projectile needs for encryption/decryption of plaintext/cyphertext during the projectile's life time; $T_{fl}$ is a maximum flight time for the projectile allowed by a fuel supply; $r_p$ is a maximum data rate for communication from the projectile to the launcher; and $r_l$ is the maximum data rate for communication from the launcher to the projectile.

13. The method of claim 12, wherein the communication datalink is established between a launcher transceiver and a projectile transceiver and after the projectile is launched by the launcher.

14. The method of claim 13, wherein the launcher encryption/decryption module is configured to use the one-time pad stored in the launcher memory to encrypt data before the data is transmitted by the launcher transceiver.

15. The method of claim 13, wherein the launcher encryption/decryption module is configured to use the one-time pad stored in the launcher memory to decrypt data received by the launcher transceiver.

16. The method of claim 13, wherein the projectile encryption/decryption module is configured to use the one-time pad stored in the projectile memory to encrypt data before said data is transmitted by the projectile transceiver.

17. The method of claim 13, wherein the projectile encryption/decryption module being configured to use the one-time pad stored in the projectile memory to decrypt data received by the projectile transceiver.

* * * * *